United States Patent
Subramanian et al.

(10) Patent No.: US 6,701,431 B2
(45) Date of Patent: Mar. 2, 2004

(54) METHOD OF GENERATING A CONFIGURATION FOR A CONFIGURABLE SPREAD SPECTRUM COMMUNICATION DEVICE

(75) Inventors: Ravi Subramanian, Mountain View, CA (US); Christopher Woodthorpe, Los Gatos, CA (US)

(73) Assignee: Infineon Technologies AG, Munich (DE)

( * ) Notice: Subject to any disclaimer, the term of this patent is extended or adjusted under 35 U.S.C. 154(b) by 622 days.

(21) Appl. No.: 09/772,582

(22) Filed: Jan. 29, 2001

(65) Prior Publication Data

US 2001/0034227 A1 Oct. 25, 2001

Related U.S. Application Data (60) Provisional application No. 60/178,828, filed on Jan. 28, 2000.

(51) Int. Cl.[7] .............................................. G06F 9/445
(52) U.S. Cl. ........................................................ 713/1
(58) Field of Search ................................ 713/1, 2, 100

(56) References Cited

U.S. PATENT DOCUMENTS

| | | |
|---|---|---|
| 4,096,732 A | 6/1978 | Springer |
| 4,481,583 A | 11/1984 | Mueller |
| 5,553,101 A | 9/1996 | Lim et al. |
| 5,568,475 A | 10/1996 | Doshi et al. |
| 5,901,116 A | 5/1999 | Quine |
| 5,974,049 A | 10/1999 | Ratcliff et al. |
| 6,026,117 A | 2/2000 | Ozluturk |

Primary Examiner—Thomas M. Heckler
(74) Attorney, Agent, or Firm—Darby & Darby (57) ABSTRACT

A method of generating a configuration for a configurable spread spectrum communication device is disclosed herein. The method, implemented on a computing device having a processor and a computer readable memory, starts with a first step of receiving an input identifying a desired function, and a desired operation within the desired function, to be implemented by a configurable communication device. In a subsequent step, a signal flow path for the desired operation is generated by the computing device. Next, the desired operation is mapped onto a computing element within the configurable communication device; the computing element having localized control and being function-specific. The aforementioned steps are repeated to satisfy multiple operations required to enable the desired function. Next, a configurable interconnect of the configurable electronic device is configured to enable the mapping operation and signal flow path across a computing element for each of the multiple operations which together enable the desired function.

45 Claims, 4 Drawing Sheets

METHOD OF GENERATING A CONFIGURATION FOR A CONFIGURABLE SPREAD SPECTRUM COMMUNICATION DEVICE

CROSS-REFERENCE TO RELATED APPLICATIONS

This application claims priority to the provisional patent application with the following Ser. No. 60/178,828 filed on Jan. 28, 2000.

TECHNICAL FIELD

The present claimed invention relates to the field of communications. In particular, the present claimed invention relates to an apparatus and a method for configuring a configurable electronic device.

BACKGROUND ART

Wireless communication has extensive applications in consumer and business markets. Spread spectrum techniques are gaining more popularity as a method off transmission in a wireless communication system. Among the many spread spectrum communication applications/systems are: fixed wireless, unlicensed (FCC) wireless, local area network (LAN), cordless telephony, personal base station, telemetry, mobile wireless, and other digital data processing applications. While each of these applications utilizes spread spectrum communications, they generally utilize unique and incompatible protocols for various signal processing operations, e.g., encoding and decoding, modulation and demodulation, etc. These unique and incompatible protocols often require unique hardware, software, and methodologies for the communication protocol. This practice can be costly in terms of design, testing, manufacturing, and infrastructure resources.

Besides the variation between spread spectrum communication applications, substantial variations occur over time within a given spread spectrum communication application. For example, within the code division multiple access (CDMA) cellular spread spectrum wireless application, significant changes have occurred over time. These changes take the form of a proliferation of different versions and performance levels, e.g., Interim Standard-95 (IS-95) CDMA, wideband CDMA (WCDMA), 3GPP, etc. And the pace at which improvements and new standards arise is increasing as more industry resources are focused on the needs and opportunities in this wireless communication. Unfortunately, all these factors result in minimal uniformity around the world at any one given point in time. For example, different countries and different service providers frequently use systems that are uniquely dedicated to their specific version of a communication protocol.

If a single device were capable of overcoming the variations in spread spectrum communication protocols and the variations within each protocol over time, then it could offer a common solution. Such a device would have to be substantially 'general purpose' in nature in order to accommodate such a wide variation in functions and applications. However, such a general-purpose device would typically be unable to perform any one of the various applications on its own behalf, e.g., in its manufactured state. This is an entirely expected tradeoff of generality in design for diversity in potential application. Consequently, a need arises for a method to overcome the limitations of a general-purpose spread spectrum device in order to perform a specific spread spectrum application.

Given the intrinsic ambiguity of a general-purpose spread spectrum device, a significant amount of external control will be available for tailoring it to a specific application. While a user could provide external control to the general purpose spread spectrum device manually, it would be time-consuming and inefficient. Furthermore, given the complexity of a general purpose device needed to enable it to perform a wide range of complicated and computationally intensive algorithmic data processing operations, the success of such a manual process would be improbable. Consequently, a need arises for a method to overcome the limitations of manually programming a general-purpose spread spectrum device.

Additionally, given the high quantity of variables and subcomponents in such a device, many different combinations and permutations of hardware linking and variable assignments would be possible. Thus it would be highly likely that errors, glitches, disoperation, or even inoperability would arise. Additionally, other complicated issues such as proper timing and sequencing, memory addressing, and tailoring algorithmic assignments for a general purpose spread spectrum device would prove to be a formidable task. Consequently, a need arises for a method to overcome the problems of working with an entire set of possible combinations and permutations of hardware sequencing and variable assignments.

Even if it was possible to successfully set up the general-purpose device for a specific application, verification of the setup might be difficult. For example, a device may be able to perform acceptably in one scenario of variables. However, this performance may not guarantee the successful operation of the device in a different scenario. Consequently, a need arises for a method and apparatus to verify and simulate the operation of the general purpose device receiving external control for a specific application.

SUMMARY OF THE INVENTION

The present invention provides a method and apparatus that overcomes the limitations of a general-purpose spread spectrum device in order to perform a specific spread spectrum application. Additionally, the present invention provides a method that efficiently manages external control of a general purpose spread spectrum device such that it can perform a specific application. Furthermore, the present invention provides a solution that overcomes the problems of working with an entire set of possible combinations and permutations of hardware sequencing and variable assignments for the general purpose spread spectrum device. The present invention also provides a method and apparatus to verify and simulate the operation of the general-purpose device, which received external control for a specific application.

In particular, the present invention provides an apparatus and method that generates a configuration for a configurable spread spectrum device. The method, implemented on a computing device having a processor and a computer readable memory, starts with a first step of receiving an input identifying a desired function, and a desired operation within the desired function, to be implemented by a configurable communication device. In a subsequent step, a signal flow path for the desired operation is generated by the computing device. Next, the desired operation is mapped onto a computing element, or set of computing elements, within the configurable communication device. The computing element in the present embodiment has localized control and is function-specific. The aforementioned steps are repeated to satisfy multiple operations required to enable the desired function. Next, a configurable interconnect of the configurable electronic device is configured to enable the signal flow path and mapping operations across a computing element for each of the multiple operations which together, enable desired function.

A second embodiment of the present invention provides an electronic device with a processor and a computer readable memory coupled to the processor. The electronic device contains instructions and data stored on the computer readable memory that, when executed using the processor enables the aforementioned method of the first embodiment. The method and apparatus for providing configuration information to a configurable communication device is referred to in one embodiment as a programming interface.

These and other objects and advantages of the present invention will become apparent to those of ordinary skill in the art after having read the following detailed description of the preferred embodiments, which are also illustrated in the various drawing figures.

BRIEF DESCRIPTION OF THE DRAWINGS

The drawings included herewith are incorporated in and form a part of this specification. The drawings illustrate embodiments of the invention and, together with the description, serve to explain the principles of the invention. It should be understood that the drawings referred to in this description are not drawn to scale unless specifically noted as such.

DETAILED DESCRIPTION OF THE INVENTION

Reference will now be made in detail to the preferred embodiments of the invention. Examples of the preferred embodiment are illustrated in the accompanying drawings. While the invention will be described in conjunction with the preferred embodiments, it is understood that they are not intended to limit the invention to these embodiments. Rather, the invention is intended to cover alternatives, modifications and equivalents, which may be included within the spirit and scope of the invention, as defined by the appended claims. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

The present invention can be implemented in a wide variety of digital spread-spectrum wireless communication systems or techniques that utilize code sequences. Code sequences are utilized in wireless communications for many functions including, but not limited to: filtering, searching, modulation, and demodulation. The systems or techniques which utilize code sequences include, but are not limited to, fixed wireless, unlicensed Federal Communications Commission (FCC) wireless systems, wireless local area network (W-LAN), cordless telephony, cellular telephony, personal base station, telemetry, and other digital data processing applications. The present invention can be applied to both transmitters, e.g., a base station, and to receivers, e.g., a terminal, for fixed wireless, W-LAN, cellular telephony, and personal base station applications.

In particular, one fixed wireless application to which the present invention may be applied is a metropolitan multipoint distribution system (MMDS). Examples include wireless cable broadcast, or two-way wireless local loop (WLL) systems. Some examples of a W-LAN, that can communicates digitized audio and data packets, for which the present invention can be applied include Open Air, and the Institute of Electrical and Electronics Engineers (IEEE) specification 802.11b. In yet another application, a specific example of unlicensed FCC applications to which the present invention may be applied includes the Industrial, Scientific, and Medical band (ISM) devices, which can include cordless telephony products. Personal base stations can utilize either cordless or cellular telephony wireless communication standards. Lastly, the cellular telephony systems in which the present invention can be applied includes, but is not limited to, IS-95, IS2000, ARIB, 3GPP-FDD, 3GPP-TDD, 3GPP2, 1 EXTREME, or other user-defined protocols. The range of code sequences utilized in the exemplary spread spectrum applications disclosed herein, are useful to define the class of functions for which the present configurable code generator unit is applicable.

CONFIGURATION SYSTEM

Figure 1A:
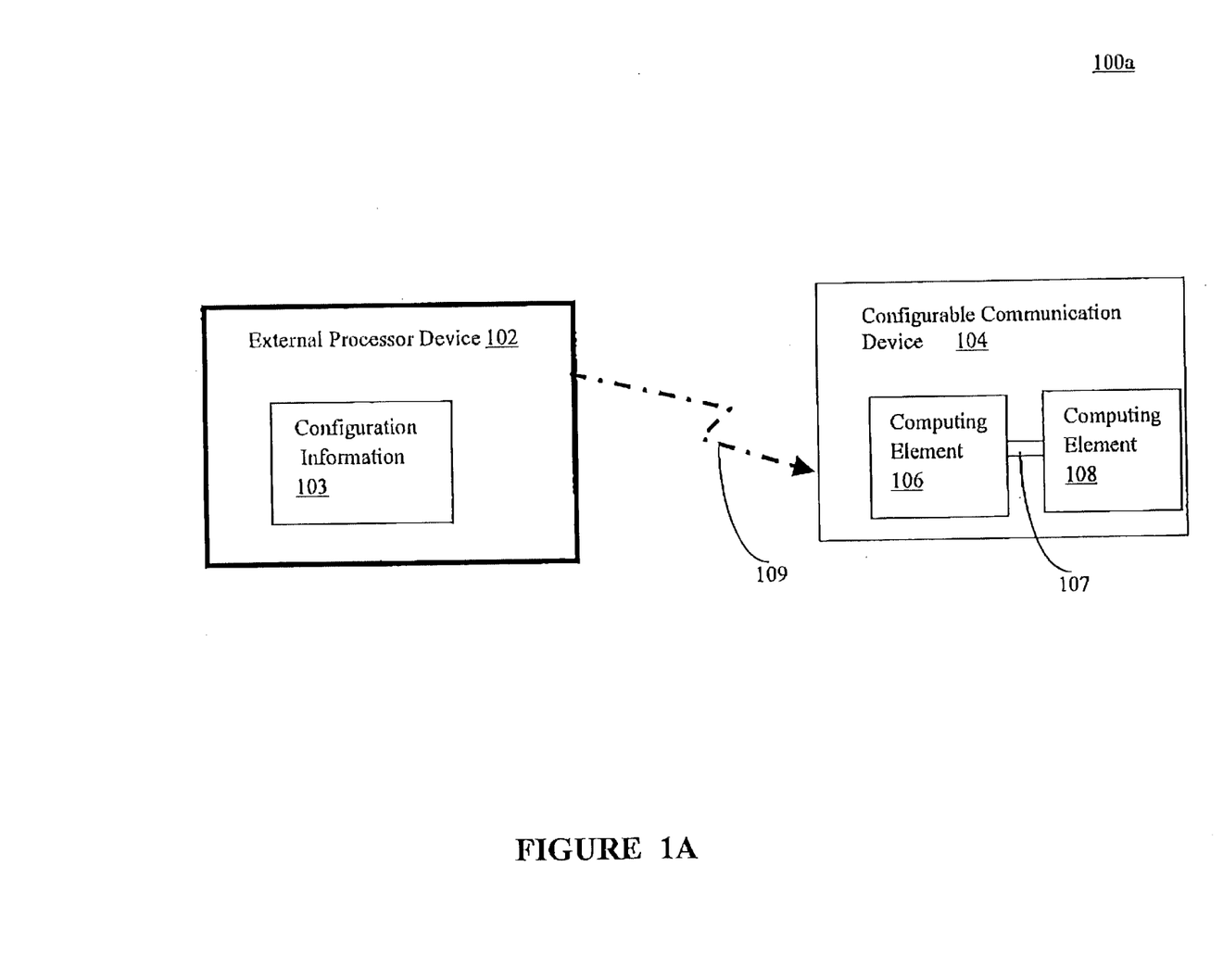
FIG. 1A is a block diagram of a configuration system, in accordance with one embodiment of the present invention.

Referring now to FIG. 1A, a block diagram of a configuration system is shown, in accordance with one embodiment of the present invention. Configuration system (or programming interface system) 100a includes an external processor device 102 and a configurable communication device 104. External processor device 102 contains configuration information 103 stored in memory for the configurable communication device. External processor device is a workstation in one embodiment.

Configurable communication device includes two computing elements 106 and 108, in the present embodiment, that are coupled by a line 107. Line 107 in one embodiment is a configurable interconnect that can selectively couple elements 106 and 108, or parts thereof. An exemplary configurable communication device 104 is provided in co-pending U.S. patent application Ser. No. 09/772,584, entitled "A WIRELESS SPREAD SPECTRUM COMMUNICATION PLATFORM USING DYNAMICALLY RECONFIGURABLE LOGIC,". This related application is commonly assigned, and is hereby incorporated by reference Configuration information 103 from external processor device 102 is communicated to configurable communicating device by interface 109. Interface 109 is a wired communication link that couples external processor device 102 and configurable communication device 104 in one embodiment. However, in another embodiment, interface 109 is an electronic storage medium, e.g., CD-ROM and host device, which provides configuration information 103 to configurable communication device. In yet another embodiment, interface 109 is a wireless transmission from external processor device 102, or another communication device, e.g., a wireless base station or wireless test platform.

In another aspect of the present invention, configuration information is provided at the time configurable communication device 104 is manufactured and/or initially programmed for operation in the field, for the present embodiment. However, in another embodiment, configuration information is dynamically implemented at a time configurable communication device 104 is in operation in the field.

EXTERNAL PROCESSING DEVICE

Figure 1B:
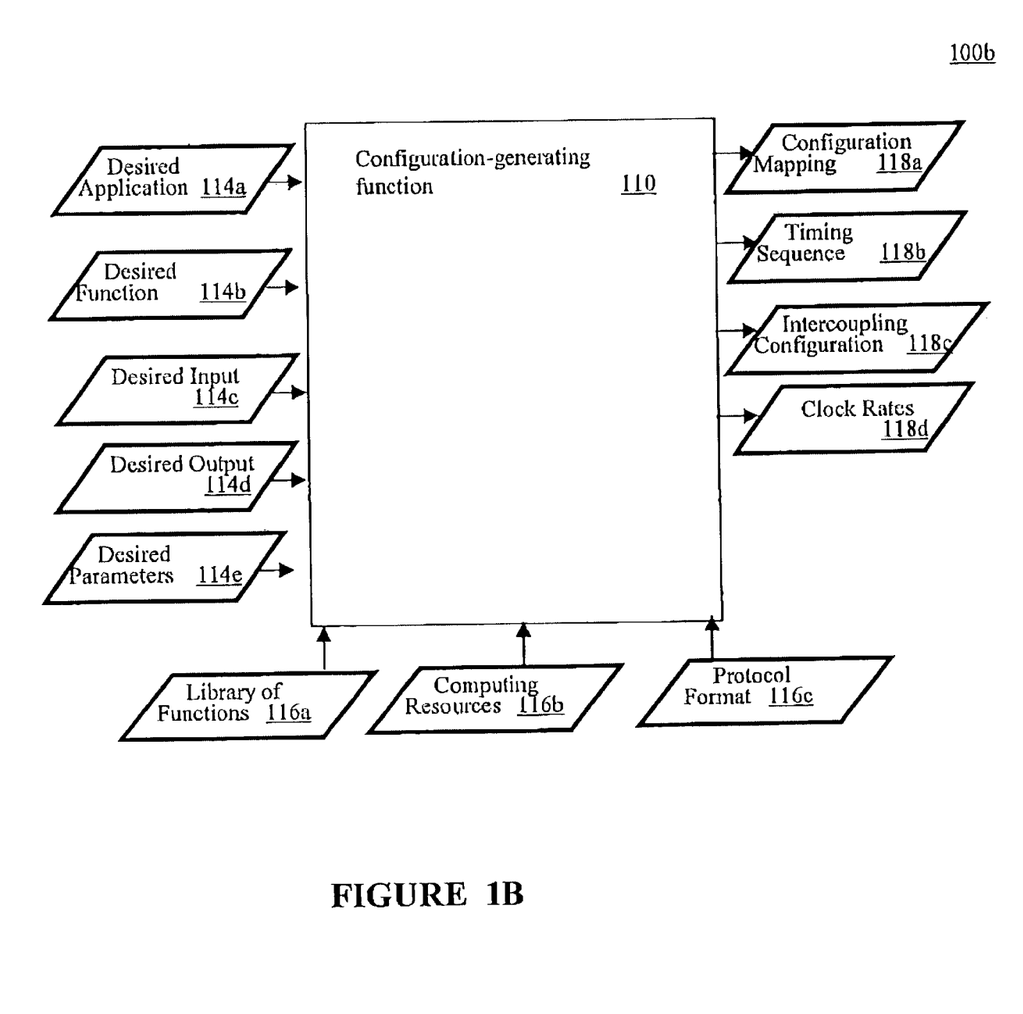
FIG. 1B is a block diagram of configuration-generating functions performed by an external processor device, in accordance with one embodiment of the present invention.

Referring now to FIG. 1B, a block diagram of configuration-generating functions performed by an external processor device is shown, in accordance with one embodiment of the present invention. Block diagram 100b provides an exemplary functional basis for generating configuration information 103 of FIG. 1A, that is ultimately destined for configuring the configurable communication device 104.

Functional block diagram 100b includes a configuration-generating function block 110 capable of receiving data and instruction inputs and capable of providing configuration outputs. In particular, the data inputs refer to the user-desired configuration of a configurable communication device 104 of FIG. 1A. In contrast, instruction inputs are instructions for application(s) desired to be implemented by configurable communication device 104. An example of such instruction inputs is industrial standards, communication protocols, etc. In a complementary manner, data inputs provided by a user can include proprietary algorithms and methodology that operate within the boundaries of, and are allowed by, the latitude within an application protocol. Lastly, configuration outputs refers to the configuration information generated by configuration-generating function block 110 that will enable configurable communication device 104 of FIG. 1A to operate according to the user's input data and the instruction data for the application.

The data inputs in the present embodiment include, but are not limited to: 1) desired application 114a of configurable communication device 104; 2) desired function 114b to be performed by configurable communication device 104; 3) desired input expected 114c to be received at configurable communication device 104; 4) desired output 114d to be generated by configurable communication device 104; 5) desired parameters 114e within configurable communication device that can accommodate user-definable proprietary and non-proprietary methodology.

As an example of user-provided data inputs, a user could provide a desired application input 114a as a "wireless local loop" (WLL) for which configurable communication device is to be configured. Similarly, the desired function input 114b can be defined by a user as a "modulation function" for which configuration information must be determined in order to operate the general purpose configurable communication device 104. The desired input 114c can refer to the format in which data is expected to be received at a computing element configured for modulation within the configurable communication device. This input format can reflect other proprietary or unique user-defined data processing methods that prepare and format the data for the subsequent modulation function. Desired output 114d is the format of the output data desired by the user. In one sense, while a communication protocol may narrowly define the format and method by which data is interfaced between multiple devices, the format and method for processing data within a device itself is left open to a user (e.g., the device's designer). In this manner, a user can develop and implement user-defined proprietary and nonproprietary algorithms and operations that are suited to the user's need, e.g., leveraging intrinsic tradeoffs such as quality of service (QOS), power usage, etc.

The instruction inputs provided to configuration-generating function block 110 include, but are not limited to: 1) a library of functions input 116a; 2) computing resources input 116b, for the configurable communication device; and 3) protocol format input 116c. An example of a library of functions would include default configurations or functions accommodated by configurable communication device 104. In one embodiment, library of functions input 116a can include functions that are common between multiple applications, and thus allow for narrow tailoring by a user. An example of computing resources input 116b can include the number of computing elements available (e.g., computing element 106 and 108 of FIG. 1A), the flexibility of any configurable interconnects (e.g., configurable interconnect 107 of FIG. 1A), etc., for a given configurable communication device, e.g., device 104 of FIG. 1A. Lastly, an example of protocol format input 116c can include rules and definitions dictated by a protocol with which a user desires the configurable communication device to comply, e.g., rules for syntax, format, timing, etc.

Outputs generated by configuration-generating function block 110 include, but are not limited to: 1) configuration mapping 118a; 2) timing sequence 118b; 3) intercoupling configuration 118c; and 4) clock rates 118d. An example of configuration mapping 118a generated by configuration-generating function block 110 includes settings for selective interconnects, bit words to enable configurable devices, threshold values for logic functions, etc. This information is provided for computing elements, e.g., 106 and 108 of FIG. 1A, as well as their subcomponents. Furthermore, this information is provided for these elements and subcomponents at different times in a processing cycle. Timing sequence output 118b includes information such as when certain computing elements will implement a specific configuration, when certain computing elements will be selectively coupled, and when certain computing elements will be given autonomy to perform their operations and functions. Lastly, an example of intercoupling configuration 118c includes information defining what computing elements are coupled to each other, and what subcomponents of computing elements are intracoupled. Exemplary user-definable data inputs 114a through 114e, instruction inputs 116a through 116c, and configuration outputs 118a through 118d, are provided in the detailed description section, and in Appendix A, of patent application "A WIRELESS SPREAD SPECTRUM COMMUNICATION PLATFORM USING DYNAMICALLY RECONFIGURABLE LOGIC," incorporated by reference herein.

Figure 2:
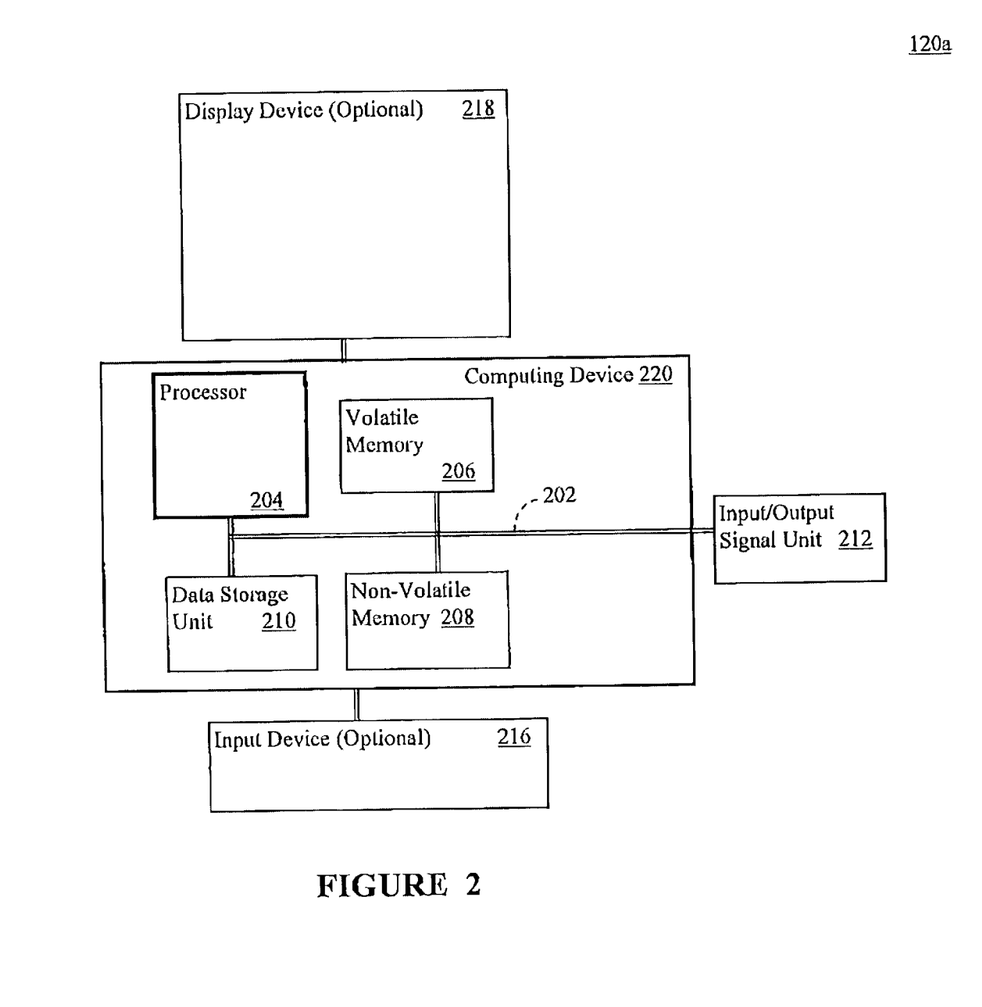
FIG. 2 is a block diagram of an external processor device for generating a configuration for a configurable communication device, in accordance with one embodiment of the present invention.

Referring now to FIG. 2, a block diagram of a computer system used to interface a user with a configurable heterogeneous multiprocessor device is shown, in accordance with one embodiment of the present invention. Computer system 120a provides an exemplary implementation of external processor device 102 of FIG. 1A that enables configuration-generating function block 110 of FIG. 1B.

Computer system 120a includes a core computing device 220 which includes a control/data bus 202 for communicating information, a central processor unit 204 for processing information and instructions, coupled to bus 202, and a memory unit 206 for storing information and instructions, coupled to bus 202. Memory unit 206 can include memory configuration such as random access memory (RAM) for storing temporal information and instructions for central processor unit 204. Complementally, non-volatile memory 208 can include a memory configuration that is read only memory (ROM), for storing static information and instructions for central processor unit 204. Data storage unit 210 can store program instructions and large data base type information.

Computer system 120a also includes an optional display device 218. Display device 218 can be any type of display, such as an analog or a digital display unit. Computer system 120a also includes an optional input device 216 coupled to bus 202. Optional input device 216 can include any input device, e.g., an alphanumeric input device such as a keyboard, or a cursor control device such as a mouse, etc. Optional input/output signal unit device 212 provides a communication interface from computer system 120a, e.g. serial port, etc.

Bus 202 provides an exemplary coupling configuration of devices in computer system 120a. Bus 202 is shown as a single bus line for clarity. It is appreciated by those skilled in the art that bus 202 can include subcomponents of specific data lines and/or control lines for the communication of commands and data between appropriate devices. It is further appreciated by those skilled in the art that bus 202 can be a parallel configuration, a serial configuration, and that bus 202 can include interconnects, gateways, and/or translators as appropriate for a given application.

It is also appreciated that computer system 120a is exemplary only and that the present invention can operate within a number of different systems such as a general purpose computer system, a dedicated work station, an embedded control system, etc. Furthermore, the present invention is well suited to using a host of intelligent devices that have similar components as exemplary computer system 120a.

FLOWCHART IMPLEMENTATION OF PROCESSES

Figure 3:
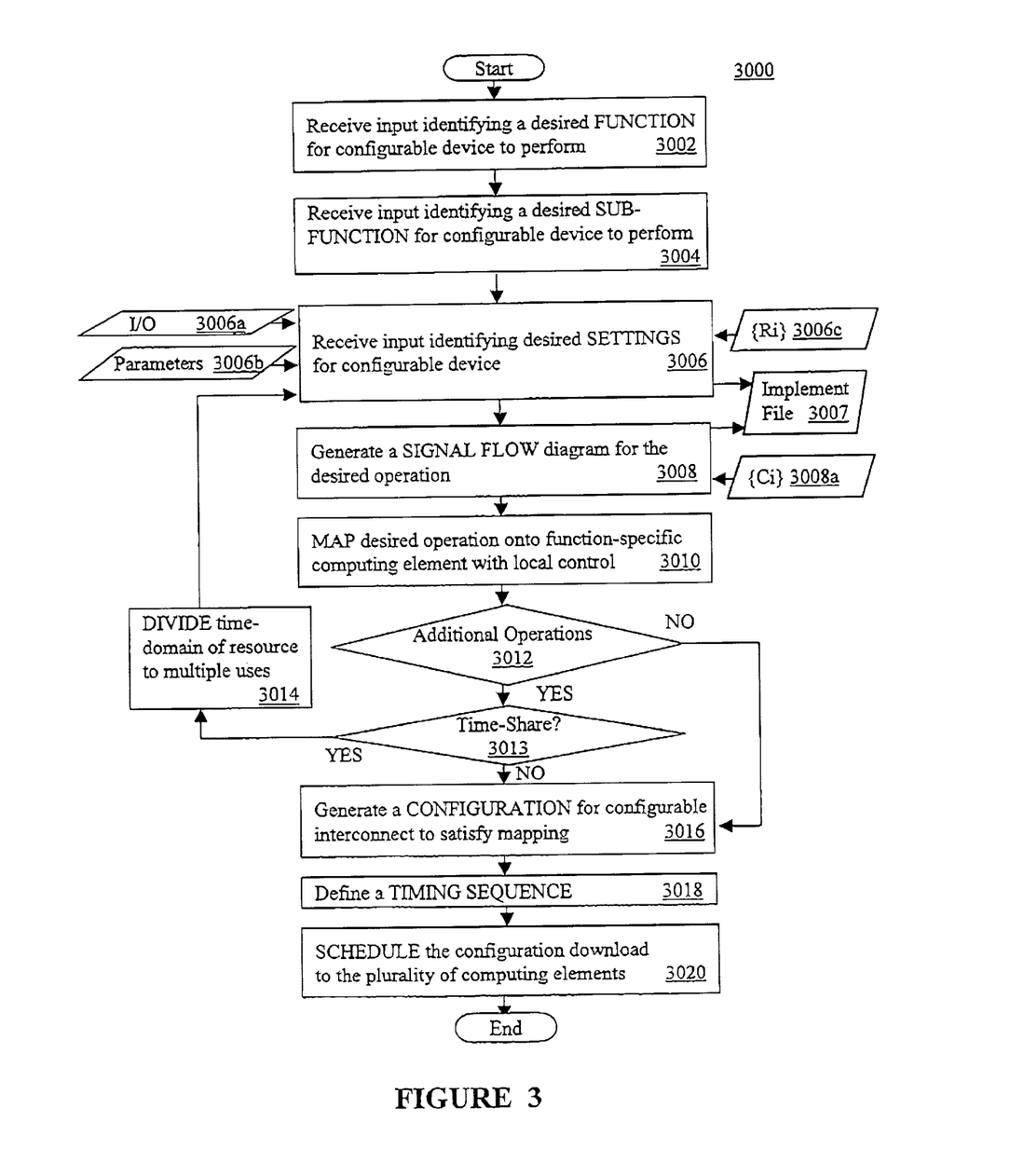
FIG. 3 is a flowchart of the process used to design a configuration of a configurable spread spectrum electronic communication device, in accordance with one embodiment of the present invention.

Referring now to FIG. 3, a flowchart of the process used to design a configuration of a configurable spread spectrum electronic communication device is shown, in accordance with one embodiment of the present invention. Flowchart 3000 provides exemplary steps and exemplary sequencing of steps by which configuration system 100a, functional block diagram 100b, and computer system 120a can operate in harmony to enable the present invention. The present flowchart promotes efficient, robust, and timely configuring operations for a configurable communication device. Flowchart 3000 is implemented, in general, using the immediately previous figures.

Flowchart 3000 begins with step 3002. In step 3002 of the present embodiment, input is received at a computer identifying a desired function for the configurable device to perform. For example, in one embodiment a user may need to select a communication (or arithmetic) function such as modulating, demodulating, coding, or decoding, as provided for in FIG. 1B. However the present invention is well suited to implementing any type of function within the range of operation of the configurable hardware. Step 3002 is implemented, in one embodiment, by input 114a of FIG. 1B being provided to computer system 120a of FIG. 2, wherein a user provides input data via optional input device 216, or from memory storage 206, 208 or 210, of computer system 120a in FIG. 2. A user can input any desired function for step 3002 that is accommodated in a software library of functions 116a, e.g, Java, C language, etc. in one embodiment.

In particular, a user can take advantage of the hierarchical approach of the interface, leveraging the notion of extensible data types to exploit the flexibility inherent in the architecture. The desired function can be a high level function, such as modulation, which can be further subdivided into more discrete sub functions, depending upon the level of programming desired for an application and available in library of functions input 116a. Appendix A of patent application "A WIRELESS SPREAD SPECTRUM COMMUNICATION PLATFORM USING DYNAMICALLY RECONFIGURABLE LOGIC," incorporated by reference herein provides an exemplary list of modem and codec functions and programmability, for which hardware kernels (or computing elements)106 and 108 of FIG. 1A may be configured for an exemplary spread spectrum application. The present invention is well suited to a wide range of data processing functions and kernels that can be programmed by step 3002. Step 3002 can provide a list of these sub functions or operations to the user, via a graphical user interface (GUI) on optional display device 218 of FIG. 2 for use in subsequent step(s) of flowchart 3000.

In the present embodiment, the list of functions provide a one-to-one correspondence to, and is thus limited by, the computing elements 106 and 108 of FIG. 1A. However, the present invention is well suited to implementing step 3002 with varying levels of functional granularity. For example, in a typical WCDMA application, the dominant computations are centered around five major signal processing functions: chip matched filtering, code-epoch search, chip demodulation/despreading, symbol-rate processing, and channel decoding. A user has the ability to completely change the interconnection between these groups, or bypass the group(s) via the use of an interface in the configurable communication device. In this manner, the capability of the data-flow specific configurable interconnect between islands of computation kernels can be fully exploited. Following step 3002, flowchart 3000 proceeds to step 3004.

In step 3004 of the present embodiment, an input is received at a computer identifying a desired sub function within the given function, or a desired operation within a given sub function, for the configurable device to perform. Step 3004 is implemented in the same manner as step 3002, in one embodiment. A user can input any desired sub function, if any, that is accommodated in a programming guide provided as library of functions input 116a of FIG. 1B. Programming guide can be any suitable program language. For example, one embodiment of the present invention provides a list of the functions in a Data Kernel Specification List, from which a user may select demod and codec functions. Data Kernel Specification List is described in Appendix A of co-pending application "A WIRELESS SPREAD SPECTRUM COMMUNICATION PLATFORM USING DYNAMICALLY RECONFIGURABLE LOGIC," incorporated by reference herein. As an example, a user may select a sub function of code modulation within the larger function of modulation. Following step 3004, flowchart 3000 proceeds to step 3006.

In step 3006 of the present embodiment, input is received identifying desired settings for a desired function. Inputs to step 3006 include, but are not limited to: input and output (I/O) parameters 3006a desired to and from a function implemented in a computing element, e.g., elements 106 and 108 of FIG. 1B. Similarly, input to step 3006 also includes parameter and formats input 3006b for dictating internal operating parameters for the function implemented by computing elements of a configurable device 104 of FIG. 1A. A specification list can provide different inputs, outputs, and parameters for functions that are available for designing a user-specific configuration of a configurable device. While the present embodiment provides for specific input, output and parameter choices, the present invention is well suited to using a wide range of options, as desired for a given application. A set of available resources {Ri} input 3006c is also provided to step 3006 for evaluation. Input 3006c represents the set of baseline primitive compute kernels, e.g., computing element 106 of FIG. 1A, found in configurable communication device 104. The available resources {Ri} are provided in the design of the communication device based on anticipated functions, sub functions, and operations required for protocol variation, potential algorithmic flexibility needs, projected future algorithmic and protocol growth, and indeterminate items. In one embodiment, the resources of a given configurable device can be statically provided for in memory of computer system 120a in FIG. 2. Alternatively, the resources of a given configurable device can be dynamically determined by polling components of a configurable device, e.g., communication device 100a, via a coupling arrangement (wireless or serial/bus hardwire) through computer system 120a. Following step 3006, flowchart 3000 proceeds to step 3008.

In step 3008 of the present embodiment, a signal flow path (or diagram) of the desired operation is generated. A signal flow path is a listing of the interfaces, e.g., the chosen input and output types and formats, for a given function. Step 3008 is implemented, in one embodiment, by processor 204 of FIG. 2 selectively matching the desired interconnectivity between configurable elements (e.g., elements 106 and 108 of FIG. 1A) with the allowed interconnections available on a given configurable communication device. Thus, a set of allowed connections {Ci} input 3008a is provided to step 3008 for evaluation. In the present embodiment, the allowed set of connections {Ci}, e.g., a hierarchical interconnect configurations of the configurable device, is provided by a programming guide, e.g., library of functions 116a of FIG. 1B. Input 3008a represents the amount of reconfigurability provided inside a hardware kernels, and between hardware kernels, e.g., via reconfigurable interconnect 107 of FIG. 1A.

Step 3008 includes the creation of an original system dataflow. The original system dataflow can be created from a written specification and system simulation. From the original system dataflow, specific algorithm threads are identified. The specific threads are identified in the present embodiment by a rank ordering of the computational complexity. One embodiment of the rank ordering in a typical WCDMA application, where the dominant computations are centered around five major signal processing functions, include: chip matched filtering, code-epoch search, chip demodulation/despreading, channel decoding, and symbol-rate processing. These algorithm threads typically require algorithms that are made up of millions of operations per second (MOPS). An exemplary spread spectrum application can group these algorithms into five categories based on their MOPs. These groups include: 1) a chip-rate processor group; 2) symbol-sequence processor group; 3) parameter-estimation processor group; 4) channel-element (multi-finger) processor group; and 5) front-end processor group. A user has the option to bypass a processor group via the bypass mechanism and/or the coprocessor interface. Using the notion of hierarchical interconnectivity, the present invention offers a large degree of flexibility in the user defining the preferred hardware-software partitioning boundary. With the present embodiment, this boundary can in fact change over time based on the type, capability, performance, and computational efficiency of host instruction-set processor, e.g., processor 120a of FIG. 2, and of configurable communication device, e.g., configurable device 104 of FIG. 1A.

The allowed interconnections in step 3008 are provided in the design of the communication device based on anticipated flexibility due to protocol variation, potential algorithmic flexibility needs, projected future algorithmic and protocol growth, and indeterminate items. In one embodiment, the allowed connections {Ci} for a given configurable device can be statically provided for in memory of computer 120a. Alternatively, the allowed connections {Ci} for a given configurable device can be dynamically determined by polling components of a configurable device, e.g., communication device 100a, via a coupling arrangement (wireless or serial/bus hardwire) through computer system 120a. Step 3008 contributes a suite of communication primitives, corresponding to the connections validated in step 3008, to implementation file output 3007. Implementation file 3007 describes how a function is built from the set of baseline data and control structures in the hardware kernels. In particular step 3008 involves building an abstraction of the datapath configuration through the functions for the implementation file output 3007.

By providing a diagram of these interfaces, e.g., in a listing, state machine, or table, the compatibility of data types between sequential functions and hardware implementations can be checked and corrected, where necessary. Thus, step 3008 provides a method of quality control for the implemented function provides a level of guarantee of operability and efficiency. By intelligently tracking the interfaces of functions and sub functions, the computer can properly sequence an unordered user-selected list of functions or sub functions. Step 3008 is implemented, in one embodiment, by storing data types in memory from memory storage, such as blocks 206, 208 or 210, of computer system 120a in FIG. 2, and matching the interfaces via processor 204. Following step 3008, flowchart 3000 proceeds to step 3010.

In step 3010 of the present embodiment, the desired operation is mapped onto a function-specific computing element having local control. Step 3010 is implemented, in one embodiment, by processor 204 matching the desired functions, and/or sub functions and operations chosen in steps 3002 and 3004 with the available hardware resources of a given configurable device.

Mapping step 3010 essentially ties a function to a hardware kernel with a suitable architecture. In particular, the parameters selected in step 3006 further configure the hardware kernel to the specific sub function or operation within a class of possible sub functions or operations. This scenario occurs for the many different mathematical, operational, and logical categorizations for the different functions used in a given application and the range of reconfigurability for which individual hardware kernels can be designed.

In an exemplary embodiment, steps 3002 through 3012 can be accommodated for a class of despreading and equalization functions with different parameters that correspond to the different communication protocols to which they are tied. This embodiment provides a hardware kernel (or computing element) with sufficient reconfigurability, to accommodate the variations of the despreading and equalization functions between the protocols. Consequently, the parameters of reconfigurability are provided to a user for the desired selection. Step 3010 contributes a suite of extensible data types, corresponding to the hardware kernels and their configurable properties, to implementation file output 3007 by specifying the available resources appropriate to satiate a desired function and/or sub function. Other inputs can be considered for step 3010 besides available resources. For example, flexibility of a local controller (not shown) of a computing element 106, can also be considered for step 3010. Mapping of desired functions to available resources in a multiprocessor device having algorithmic specific components is especially complementary because the hardware components (e.g., computing elements 106 and 108 of FIG. 1A) are essentially locally controlled object-oriented devices.

As a brief example applied to step 3002 through 3010, a user selects a modulation function in step 3002, and an integrate and dump sub function for step 3004. As a result of these inputs, the variation of integration lengths from the set {4, 8, 16, 32, 64, 128, 256}, will be provided as possible parameter choices. If the user is implementing a 3GPP standard, then an exemplary parameter choice entered for step 3006 would be a 64-bit integration length, as required by the standard for a specific mode. Subsequently, a signal flow path per step 3010 will be provided, and the kernel designed for the integrate and dump class of functions will be mapped per step 3008 with the appropriate parameter setting. While the present example is applied to a specific function and parameter variation, the present invention is well suited to a wide range of applications, functions, and sub functions. Following step 3010, flowchart 3000 proceeds to step 3012.

In step 3012 of the present embodiment, an inquiry determines whether additional sub-functions or operations are desired. If no additional sub functions or operations are desired, then flowchart 3000 proceeds to step 3016. However, if additional sub functions or operations are desired, then flowchart 3000 proceeds to step 3013. Step 3012 provides the logic to iteratively build up the quantity and types of sub functions and operations necessary to accommodate a complete function within the configurable device, e.g., to build up a modem function within a communication device.

Step 3013 arises if additional functions or operations are desired, per step 3012. In step 3013 of the present embodiment, an inquiry determines whether timesharing of resources are desired. That is, depending on the sub function or operation desired and its processing rate requirement, and depending upon the processing rate of a given component of a configurable device, the component may have idle time within a system cycle to accommodate additional operations. For example, computing element 106 of FIG. 1A can be configured directly from a host processor (not shown) of configurable communication device 104 to operate in multiple modes depending on macroscopic parameters such as the standard, and microscopic parameters such as the integration window for a search correlator. An exemplary sequencing of the modem and codec functions (described in Appendix A of co-pending application "A WIRELESS SPREAD SPECTRUM COMMUNICATION PLATFORM USING DYNAMICALLY RECONFIGURABLE LOGIC," incorporated by reference herein) realize a variety of transceiver signal paths by configuring the hardware kernels and interconnect according to the types of operations and dataflow desired. Following step 3013, flowchart 3000 proceeds to step 3014.

In step 3014 of the present embodiment, the time domain of resources is divided for multiple uses. Step 3014 is implemented by accounting for the capabilities of the components, as described in step 3013, in a configurable device. The allocation process can be implemented using processor 204 of FIG. 2 along with computing resources input 116b of FIG. 1B which can be stored in memory 206, 208, or 210 of FIG. 2. In short, components 106 and 108 of configurable communication device 104 of FIG. 1A are treated as a hardware computation resource that can be applied to a single computation process, e.g., a multipath of a given channel, in one embodiment. However, in the present embodiment, the computation resource provided by exemplary components 106 and 108 of configurable communication device 104 can be enhanced by running them at a clock rate higher than that required by a process, e.g., higher than the data rate for a communication protocol. In this manner, resources of individual computation components, e.g., a configurable demodulator, can be time-shared (or divided) across multiple computation processes, e.g., several multipaths and/or multiple channels. Configuration and state data for each of the time-shared resources of the configurable device will be provided by flowchart 3000. Additional information on the design and implementation of configurations into a configurable communication device is provided in co-pending US patent application Ser. No. 09/492,634 entitled "IMPROVED APPARATUS AND METHOD FOR MULTI-THREADED SIGNAL PROCESSING" by Ravi Subramanian et al., attorney docket number MORP-P002. This related application is commonly assigned, and is hereby incorporated by reference. Following step 3014, flowchart 3000 returns to step 3006 through 3010 where the time-shared resource can be accounted for in the signal flow path and the mapping operation.

Step 3016 arises if no additional functions or operations are desired, per step 3012. Step 3016 accounts for the condition where a desired configuration for a configurable device is essentially fixed for actual implementation onto the configurable device via the subsequent steps. In step 3016 of the present embodiment, a configuration for the configurable interconnect is generated in order to satisfy the mapping step 3010. Thus, step 3016 accounts for all the individual input/output data lines (not shown) for the hardware kernels, e.g., computing element 106 and 108 of FIG. 1A.

Step 3016 also accounts for the limitations in the reconfigurable interconnect, which in one embodiment has limited interconnectability between all the different configurable hardware kernels. In one embodiment, step 3016 generates a rule set that establishes the configuration of the configurable interconnect, with digital instructions that turn on the electronic devices, e.g., transistors, of the interconnect and thus make the appropriate interconnections. Step 3016 is implemented, in one embodiment, by storing the configuration, or rule set, in memory, which is accessible to the reconfigurable interconnect. However, the present invention is well suited to implementing step 3016 using alternative storage techniques. Furthermore, if hardware kernel resources are time shared, then more than one configurable interconnect rule set, or configuration can exist, and thus becomes reconfigurable between the multiple rule sets. The periodicity of the configuration of a configurable interconnect can range widely, e.g., from milliseconds to months, depending upon the application. Following step 3016, flowchart 3000 proceeds to step 3018.

In step 3018 of the present embodiment, a timing sequence for the configuration of the configurable interconnects and for the hardware kernels is defined. In step 3018 of the present embodiment, input is received at a computer identifying a desired function for the configurable device to perform. Step 3018 is implemented, in one embodiment by a user providing data input via optional input device 216, or from memory storage 206, 208 or 210, of computer system 120a in FIG. 2. A user can input any desired function that is accommodated in a programming guide, e.g., library of functions 116a of FIG. 1B. However, the present invention is well suited to any type of functions, as provided for in the configurable device.

The function desired in step 3018 can be a high level function, such as modulation, that can be further subdivided into more discrete sub functions. Step 3018 can provide a list of these sub functions or operations to the user, via a graphical user interface (GUI), for use in subsequent step(s) of flowchart 3000. In the present embodiment, the list of functions provide a one-to-one correspondence to, and is thus limited by, the computing elements, e.g., computing elements 106 and 108 of FIG. 1A. The present invention is well suited to implementing step 3018 at differing levels of function granularity. Notably, the configuration designed for the configurable architecture is data-rate scalable because of the locally controlled autonomous hardware kernels. That is, turning up the system clock speed can turn up the speed of the entire communication device, e.g., 100a. Following step 3018, flowchart 3000 proceeds to step 3020.

In step 3020 of the present embodiment, the configuration download is scheduled for the plurality of computing elements. Step 3020 provides for the swap of configuration data for a time-shared hardware kernel resource where the configuration changes. For example, two communication channels may require different configurations of integrate and dump function, e.g., IS-95 for one channel and CDMA 2000 for another channel, or Japanese ARIB WCDMA and ETSI 3GPP WCDMA, that operates concurrently in a base station. For a given function-specific kernel that will support the despread function, the configuration must change for the appropriate channel. The change in configuration depends upon the frequency of access to the despread function, e.g., the frequency can occur at a multiple of chip rate, a chip rate, or at any a period appropriate for the application. In this scenario, the hardware kernel is reconfigurable, on a very efficient basis. Note that if the given function-specific kernel is time-shared, but uses the same configuration, e.g., both channels use IS-95, and then a different configuration does not have to be scheduled for change. A final output from flowchart 3000 provides the configuration mapping 118a, timing sequence 118b, intercoupling configuration 118c, and clock rates 118d. Following step 3020, flowchart 3000 ends.

An example of a computer program that implements flowchart 3000 for a desired function, called a finger, is provided in Appendix B of co-pending application "A WIRELESS SPREAD SPECTRUM COMMUNICATION PLATFORM USING DYNAMICALLY RECONFIGURABLE LOGIC," incorporated by reference herein. A user via an implementation file, e.g., file 3007, defines the finger function by defining: the sequence of operations, the parameters that control the dataflow, and the parameters that control the initiation or termination of the function. Thus, a specific finger behavior is realized below by building the finger using the principle of an extensible data type. The sequence of operations that define a finger are determined by the user, and then declared as the finger type. The user then declares the parameters that will control the dataflow and then define the initiation and termination conditions. It is appreciated that one skilled in the art can interpret the computer language specific syntax provided in this example. This example demonstrates how the user can realize a specific level of control over the functions implemented via the hardware kernels. Thus, controllability, observability, and new configurations and behaviors can be realized via using the extensible data types of the present invention. Thus the present invention overcomes limitations associated with the prior art configurations.

By using flowchart 3000, the present embodiment enables the structure of each channel element to be completely under the control of the user/programmer. That means that all the dataflow, controlflow, and interconnect configurabiltiy can be changed while in operation, enabling the creation of completely new dataflow or controlflow processing chains for a given channel element. This level of flexibility enables a substantial amount of control, performance efficiency, and differentiation with respect to communication system architectures. Flowchart 3000 also reflects a hierarchical aspect associated with the configuration-generating function 110 of FIG. 1B, where control and interfaces iteratively span between user-level language function library 116a to machine-level commands for the communication device, e.g., configuration mapping output 118a. For example, flowchart 3000 can be used to program a dataflow machine, e.g., communication device 100a, to operate as a spread spectrum wireless transceiver modem for the following standards via software developed by a system designer:

IS-95B
IS-95C
IS-2000 (1×RTT, 3×RTT)
3GPP 3.84 Direct Spread Mode (FDD)
ARIB 4.096 Mcps WCDMA.

Specifically, each channel element can be built-up by the user from the set of reconfigurable kernels to realize a reconfigurable multi-channel CDMA digital base band modem signal path that performs all the digital modulation-demodulation as well as channel encoding-decoding required per logical channel for all narrowband and wideband CDMA standards. Some possible configurations that a user can realize by configuring the hardware kernels and the configurable interconnect in the communication device are summarized below, for the forward (downlink) and reverse (uplink) links:

Forward Link
    1×RTT evolution (IS-95B, IS-95C, IS-2000)- all radio configurations as described in TIA/EIA IS2000.2
    3×RTT multicarrier mode
    3GPP 3.84 MHz Direct-Spread Mode (FDD)
    ARIB 4.096 Mcps WCDMA Reverse Link
    1×RTT evolution (IS-95B, IS-95C, IS-2000)- all radio configurations as described in TIA/EIA IS2000.2
    3GPP 3.84 MHz Direct-Spread Mode (FDD)
    ARIB 4.096 Mcps WCDMA The present invention is well suited to using a wide range of voice and data channel combinations, as chosen and designed for a specific application. This platform is designed to support a variety of channel rates depending upon the service and radio configuration selected by the user via flowchart 3000. Several exemplary computer program implementations of flowchart 3000a for a spread spectrum system are provided in Appendix B of co-pending application "A WIRELESS SPREAD SPECTRUM COMMUNICATION PLATFORM USING DYNAMICALLY RECONFIGURABLE LOGIC," incorporated by reference herein. In particular, Appendix B provides the specific application of a wireless base transceiver station for a CDMA application. However, the present invention is well suited to a wide range of communication applications. It is appreciated that one skilled in the art can interpret the computer language specific syntax provided in these examples.

The present embodiment applies flowchart 3000 to a digital wireless communication system. However, the present invention can be applied to a wide range of applications and a wide range of device configurations. Within the wireless communication system described in the present embodiment, the present invention is applicable to mobile units, base stations, and test platforms.

While flowchart 3000 of the present embodiment show a specific sequence and quantity of steps, the present invention is suitable to alternative embodiments. For example, not all the steps provided in flowchart 3000 are required for the present invention. In particular, flowchart 3000 provides steps 3013 and 3020 for a time-share scenario of programming a configuration for hardware kernels. However, the time-scenario is not required by the present invention, and thus, these steps may be omitted in one embodiment. Similarly, other steps may be omitted depending upon the application. In contrast, the present invention is well suited to incorporating additional steps to those presented, as required by an application, or as desired for permutations in the process. Lastly, the sequence of the steps for flowchart 3000 can be modified depending upon the application. Thus, while flowchart 3000 is shown as a single serial process, they can also be implemented as a continuous or parallel process.

Many of the instructions for the steps, and the data input and output from the steps, of flowcharts 3000 utilize memory and processor hardware components, either on a workstation, e.g. memory 206 and 208, and processor 204, per FIG. 2. The memory storage used to implement the flowchart steps in the present embodiment can either be permanent, such as read only memory (ROM), or temporary memory such as random access memory (RAM). Memory storage can also be any other type of memory storage, capable of containing program instructions, such as a hard drive, a CD ROM, or flash memory. Similarly, the processor used to implement the flowchart steps can either be a dedicated controller, an existing system processor, or it can be a dedicated digital signal processing (DSP) processor, as appropriate for the type of step. Alternatively, the instructions may be implemented using some form of a state machine.

Some portions of the detailed description, e.g., the processes, are presented in terms of procedures, logic blocks, processing, and other symbolic representations of operations on data bits within a computer or digital system memory or on signals within a communication device. These descriptions and representations are the means used by those skilled in the digital communication and computer architecture arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "generating," "mapping," "repeating," "translating," "configuring," "dividing," "defining," "time-sharing," "scheduling," "assigning," "creating," "categorizing," "identifying," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

In view of the embodiments presented herein, the present invention effectively provides a method and apparatus that overcomes the limitations of a general purpose spread spectrum device in order to perform a specific spread spectrum application. Additionally, the description provided herein illustrates how the present invention efficiently manages external control of a general-purpose spread spectrum device such that it can perform a specific application. Furthermore, the present invention has been shown to provide a solution that addresses the lack of structure when choosing hardware sequencing and variable assignments for the general purpose spread spectrum device. And lastly, it has been described how the present invention provides a verifies and simulates the operation of the general-purpose device which received external control for a specific application.

The foregoing descriptions of specific embodiments of the present invention have been presented for purposes of illustration and description. They are not intended to be exhaustive or to limit the invention to the precise forms disclosed, and naturally, many modifications and variations are feasible in light of the above teaching. The embodiments were chosen and described in order to best explain the principles of the invention and its practical application, to thereby enable those skilled in the art to best utilize the invention and various embodiments with various modifications as is suitable to the particular use contemplated. It is intended that the scope of the invention be defined by the claims appended hereto and their equivalents.

What is claimed is:

1. In a computer having a processor and a computer readable memory coupled to each other, a method of generating a configuration for a configurable communication device to implement a desired function, the method comprising the steps of:
   a) receiving, at the computer, an input identifying a desired operation to be implemented by the configurable communication device;
   b) generating, on the computer, a signal flow path of the desired operation; and
   c) mapping, via the computer, the desired operation onto a computing element within the configurable communication device, the computing element having localized control and being function-specific.

2. The method recited in claim 1 further comprising the step of:
   d) repeating step c) for each of a plurality of computing elements within the configurable communication device capable of the desired operation.

3. The method recited in claim 1 further comprising the step of:

d) repeating steps a) through c) as necessary to satiate a plurality of operations that enable the desired function.

4. The method recited in claim 3 further comprising the step of:
  d) translating the signal flow path into configuration mappings for each of the computing elements used to implement plurality of operations for the desired function.

5. The method recited in claim 4 further comprising the step of:
  e) configuring a configurable interconnect of the configurable communication device to enable the signal flow path across computing elements for each of the plurality of operations that enable the desired function.

6. The method recited in claim 1 further comprising the step of:
  d) receiving, at the computer, the desired function to be performed on the configurable communication device; and
  e) dividing the function into a set of discrete operations able to be performed on at least one of a plurality of computing elements of the configurable communication device.

7. The method recited in claim 6 further comprising the step of:
  f) repeating the receiving step d) and the dividing step e) as necessary to satiate multiple functions required for the application.

8. The method recited in claim 1 further comprising the step of:
  d) defining a timing sequence for activating each of the plurality of computing elements required to satiate the desired operation.

9. The method recited in claim 1 further comprising the step of:
  d) time-sharing resources of the computing elements to accommodate a plurality of operations.

10. The method recited in claim 9 further comprising the step of:
  e) scheduling the configuration download to computing elements of the configurable communication device based upon time-sharing step d).

11. The method recited in claim 9 wherein time-sharing step d) shares resources across multiple channels in a wireless communication application.

12. The method recited in claim 9 wherein the time-sharing in time-sharing step d) comprises the following steps:
  d1) identifying a plurality of operations desired to occur within a given system cycle;
  d2) dividing the system cycle into a plurality of sections; and
  d3) assigning each of the plurality of operations to a respective one of the plurality of sections of the system cycle.

13. The method recited in claim 3 wherein mapping step c) comprises the following sub steps:
  c1) creating an original system dataflow;
  c2) identifying specific algorithm thread;
  c3) identifying a range and types of operations contained in the algorithm thread; and
  c4) categorizing and mapping the operations into a plurality of processor groups, the processor groups representing major islands of dataflow in the reconfigurable architecture.

14. The method recited in claim 13 wherein the dataflow, control flow, or interconnect configuration is configured to change dynamically, while the configurable communication device is in operation.

15. The method recited in claim 1 wherein the configurable communication device is applicable to spread spectrum protocols.

16. An electronic device for configuring a configurable communication device, the electronic device comprising:
  a computer readable memory;
  a processor coupled to the computer readable memory, the computer readable memory containing instructions and data, that when executed on the processor, implement a method for configuring the configurable communication device, the method comprising the steps of:
    a) receiving, at the computer, an input identifying a desired operation to be implemented by the configurable communication device;
    b) generating, on the computer, a signal flow path of the desired operation; and
    c) mapping, via the computer, the desired operation onto a computing element within the configurable communication device, the computing element having localized control and being function-specific.

17. The electronic device recited in claim 16 wherein the method further comprises the step of:
  d) repeating step c) for each of a plurality of computing elements within the configurable communication device capable of the desired operation.

18. The electronic device recited in claim 16 wherein the method further comprises the step of:
  d) repeating steps a) through c) as necessary to implement a plurality of operations that enable a desired function.

19. The electronic device recited in claim 18 wherein the method further comprises the step of:
  e) translating the signal flow path into configuration mappings for each of the computing elements used to implement the plurality of operations for the desired function.

20. The electronic device recited in claim 19 wherein the method further comprises the step of:
  f) configuring a configurable interconnect of the configurable communication device to enable the signal flow path across computing elements for each of the plurality of operations that enable the desired function.

21. The electronic device recited in claim 16 wherein the method further comprises the step of:
  d) receiving, at the computer, the desired function to be performed on the configurable communication device; and
  e) dividing the function into a set of discrete operations able to be performed on at least one of a plurality of computing elements of the configurable communication device.

22. The electronic device recited in claim 21 wherein the method further comprises the step of:
  f) repeating the receiving step d) and the dividing step e) as necessary to satiate multiple functions required for the application.

23. The electronic device recited in claim 16 wherein the method further comprises the step of:
  d) defining a timing sequence for activating each of the plurality of computing elements required to implement the desired operation.

24. The electronic device recited in claim 16 wherein the method further comprises the step of:

d) time-sharing resources of the computing elements to accommodate a plurality of operations.

25. The electronic device recited in claim 24 wherein the method further comprises the step of:
   e) scheduling the configuration download to computing elements of the configurable communication device based upon time-sharing step d).

26. The electronic device recited in claim 24 wherein time-sharing step d) shares resources across multiple channels in a wireless communication application.

27. The electronic device recited in claim 24 wherein the time-sharing in time-sharing step d) comprises the following steps:
   d1) identifying a plurality of operations desired to occur within a given system cycle;
   d2) dividing the system cycle into a plurality of sections; and
   d3) assigning each of the plurality of operations to a respective one of the plurality of sections of the system cycle.

28. The electronic device recited in claim 27 wherein the method further comprises the step of: mapping step c) comprises the following sub steps:
   c1) creating an original system dataflow;
   c2) identifying specific algorithm thread;
   c3) identifying a range and types of operations contained in the algorithm thread; and
   c4) categorizing and mapping the operations into a plurality of processor groups, the processor groups representing major islands of dataflow in the reconfigurable architecture.

29. The electronic device recited in claim 24 wherein the dataflow, control flow, or interconnect configuration is configured to change dynamically, while the configurable communication device is in operation.

30. The method recited in claim 16 wherein the configurable communication device being configured is applicable to a spread spectrum protocol.

31. A computer readable medium containing therein computer readable codes that enable an electronic device to implement a method for configuring a configurable communication device, the method comprising:
   a) receiving, at the computer, an input identifying a desired operation to be implemented by the configurable communication device;
   b) generating, on the computer, a signal flow path of the desired operation; and
   c) mapping, via the computer, the desired operation onto a computing element within the configurable communication device, the computing element having localized control and being function-specific.

32. The computer readable medium recited in claim 31 further comprising the step of:
   d) repeating step c) for each of a plurality of computing elements within the configurable communication device capable of the desired operation.

33. The computer readable medium recited in claim 31 further comprising the step of:
   d) repeating steps a) through c) as necessary to satiate a plurality of operations that enable a desired function.

34. The computer readable medium recited in claim 33 further comprising the step of:
   e) translating the signal flow path into configuration mappings for each of the computing elements used to implement the plurality of operations for the desired function.

35. The computer readable medium recited in claim 34 further comprising the step of:
   f) configuring a configurable interconnect of the configurable communication device to enable the signal flow path across computing elements for each of the plurality of operations that enable the desired function.

36. The computer readable medium recited in claim 33 wherein mapping step c) comprises the following sub steps:
   c1) creating an original system dataflow;
   c2) identifying specific algorithm thread;
   c3) identifying a range and types of operations contained in the algorithm thread; and
   c4) categorizing and mapping the operations into a plurality of processor groups, the processor groups representing major islands of dataflow in the reconfigurable architecture.

37. The computer readable medium recited in claim 36 wherein the dataflow, control flow, or interconnect configuration is configured to change dynamically, while the configurable communication device is in operation.

38. The computer readable medium recited in claim 31 further comprising the step of:
   d) defining a timing sequence for activating each of the plurality of computing elements required to implement the desired operation.

39. The computer readable medium recited in claim 31 further comprising the step of:
   d) time-sharing resources of the computing elements to accommodate a plurality of operations.

40. The computer readable medium recited in claim 39 further comprising the step of:
   e) scheduling the configuration download to computing elements of the configurable communication device based upon time-sharing step d).

41. The computer readable medium recited in claim 39 wherein time-sharing step d) shares resources across multiple channels in a wireless communication application.

42. The computer readable medium recited in claim 39 wherein the timesharing in time-sharing step d) comprises the following steps:
   d1) identifying a plurality of operations desired to occur within a given system cycle;
   d2) dividing the system cycle into a plurality of sections; and
   d3) assigning each of the plurality of operations to a respective one of the plurality of sections of the system cycle.

43. The computer readable medium recited in claim 31 further comprising the step of:
   d) receiving, at the computer, the desired function to be performed on the configurable communication device; and
   e) dividing the function into a set of discrete operations able to be performed on at least one of a plurality of computing elements of the configurable communication device.

44. The computer readable medium recited in claim 43 further comprising the step of:
   f) repeating the receiving step d) and the dividing step e) as necessary to implement multiple functions required for the application.

45. The computer readable medium recited in claim 31 wherein the configurable communication device is applicable to spread spectrum protocols.

* * * * *